(12) United States Patent
Rogers et al.

(10) Patent No.: US 6,528,629 B2
(45) Date of Patent: Mar. 4, 2003

(54) MALTO-OLIGOSACCHARIDE DERIVED GLYCOSIDES

(75) Inventors: Richard G. Rogers, Moline, IL (US); Frank W. Barresi, Coralville, IA (US)

(73) Assignee: Grain Processing Corporation, Muscatine, IA (US)

( * ) Notice: Subject to any disclaimer, the term of this patent is extended or adjusted under 35 U.S.C. 154(b) by 133 days.

(21) Appl. No.: 09/726,708

(22) Filed: Nov. 30, 2000

(65) Prior Publication Data

US 2002/0099185 A1 Jul. 25, 2002

(51) Int. Cl.$^7$ .......................... C07H 17/00; C08B 37/02
(52) U.S. Cl. ................ 536/18.5; 536/18.6; 536/45; 536/46; 536/47; 536/48; 536/49; 536/103; 536/50; 536/51; 536/52; 536/53; 536/54; 536/104; 536/55; 536/55.1; 536/55.2; 536/55.3; 536/102; 536/105
(58) Field of Search ................ 536/18.5, 18.6, 536/126, 102, 45, 46, 47, 48, 49, 50, 51, 52, 53, 54, 55, 55.1, 55.2, 55.3, 103, 104, 105

(56) References Cited

U.S. PATENT DOCUMENTS

| | | | |
|---|---|---|---|
| 3,219,656 A | 11/1965 | Boettner | 260/210 |
| 3,928,318 A | 12/1975 | Panusch et al. | 260/210 |
| 4,223,129 A | 9/1980 | Roth et al. | 536/4 |
| 4,797,478 A | 1/1989 | Lebuhn et al. | 536/18.5 |
| 4,996,306 A * | 2/1991 | McDaniel, Jr. et al. | 536/18.6 |
| 5,715,849 A | 2/1998 | Vanbraekel | 132/314 |

OTHER PUBLICATIONS

Eskuchen, R. et al., "Technology and Production of Alkyl Polyglycosides," in Hill et al., ed. *Alkyl Polyglycosides: Technology, Properties and Applications*, VCH Publishers Inc., N.Y., N.Y. 1997.

* cited by examiner

Primary Examiner—Dwayne C. Jones
(74) Attorney, Agent, or Firm—Leydig, Voit & Mayer

(57) ABSTRACT

Disclosed is a method for preparing a malto-oligosaccharide derived glycoside. Generally, the method comprises providing a malto-oligosaccharide and glycosylating the malto-oligosaccharide with an alcohol or a thiol under conditions suitable to form a malto-oligosaccharide derived glycoside. Also disclosed is a method for preparing a mixture of malto-oligosaccharide derived glycosides by providing a mixture of malto-oligosaccharides and glycosylating the malto-oligosaccharides with an alcohol or a thiol under substantially anhydrous conditions to form a mixture of malto-oligosaccharide derived glycosides.

53 Claims, No Drawings

MALTO-OLIGOSACCHARIDE DERIVED GLYCOSIDES

TECHNICAL FIELD OF THE INVENTION

The invention is in the field of carbohydrate chemistry, and generally pertains to methods for the preparation of glycosides.

BACKGROUND OF THE INVENTION

Saccharide-derived glycosides are a commercially important class of carbohydrates. Such glycosides find numerous commercial applications, for example, as surfactants useful in detergents and other products. Conventionally, glycosides are prepared via the acid-catalyzed Fischer glycosylation of carbohydrates. For example, U.S. Pat. Nos. 3,928,318 and 4,797,478 teaches the production of methyl glucoside by glycosylation of glucose with methanol. Another patent, U.S. Pat. No. 4,223,129, teaches the production of alkyl polyglucosides from starch starting materials; other such reactions are taught in U.S. Pat. Nos. 3,219,656 and 4,797,478 and in Hill et all, Alkyl Polyglucosides G. Stoll, ed., VCH Publishers, Weinheim, Germany (1997).

Glycosides produced by the glycosylation of glucose typically are limited to an average degree of polymerization (DP) of about 1.3. Thus, the glucose is unable to form glycosides with higher degrees of polymerization. It has been found difficult to produce alkyl glycosides having a higher DP from higher DP starting materials. As reported in the aforementioned U.S. Pat. No. 4,223,129, for instance, the reaction with starch and an alcohol also results in products that are primarily limited to low DP alkyl glucosides, rather than glycosides having a higher DP as might be expected. If the starch-alcohol reaction is terminated prior to completion, granular starch is obtained, not glycosides having an intermediate DP profile.

The aforementioned prior references do not provide a satisfactory method for producing alkyl glycosides with a higher DP than about 1.3. It is a general object of the invention to provide such a method.

THE INVENTION

The invention is premised on the surprising discovery that higher alkyl glycosides can be prepared readily and in good yield by glycosylating a malto-oligosaccharide or mixture of malto-oligosaccharides. Although malto-oligosaccharides are similar in structure to starch, but of lower molecular weight, the malto-oligosaccharides do not degrade into glucosides upon glycosylation, as occurs with starch.

In accordance with the embodiment of the invention, a method for preparing a malto-oligosaccharide derived glycoside is provided. Generally, the method comprises providing a malto-oligosaccharide, and glycosylating the malto-oligosaccharide with an alcohol or a thiol under conditions suitable to form a malto-oligosaccharide derived glycoside. In accordance with another embodiment, the invention provides a method for preparing a mixture of malto-oligosaccharide derived glycosides by providing a mixture of malto-oligosaccharides, and glycosylating the malto-oligosaccharides with an alcohol or a thiol under substantially anhydrous conditions to form a mixture of malto-oligosaccharide derived glycosides. Additionally, the invention provides a mixture of malto-oligosaccharide derived glycosides. Surprisingly, the glycosides and glycoside mixtures of the invention are substantially soluble, even those having a high DP.

The conditions for the glycosylation reaction, such as time, pressure, and temperature, may be selected based upon the desired DP weighting of the glycoside product in the reaction (i.e., whether the DP profile of the glycoside mixture is weighted towards lower or higher DP species, relative to other mixtures formed by reacting the same or similar starting materials under different conditions). Generally, although it often is not commercially practicable to specify the glycoside DP profile with exact precision, a desired DP weighting can be selected based upon known reaction parameters. In accordance with one embodiment of the invention, glycosylation reaction conditions for an alcohol or thiol and a mixture of malto-oligosaccharides are selected based on a desired glycoside DP profile. The reaction conditions and their affect on the DP weighting for a given mixture of malto-oligosaccharides preferably are determined empirically. For instance, a glycosylation reaction may be performed under a first set of reaction conditions, and the glycoside DP weighting then may be determined. If the glycoside DP profile is not what is desired (for example, if the profile is weighted too much towards lower DP glycosides), one or more reaction conditions then may be adjusted and the reaction performed under the new conditions. These steps may be repeated using various modifications to the reaction conditions until a glycoside mixture with the desired DP weighting is obtained.

Other features of preferred embodiments of the invention are set forth below and in the appended claims.

DESCRIPTION OF THE PREFERRED EMBODIMENT

The invention generally contemplates the glycosylation of a malto-oligosaccharide, and, in preferred embodiments, a mixture of malto-oligosaccharides. The malto-oligosaccharide can be any suitable malto-oligosaccharide. Malto-oligosaccharides are well known and well characterized in the art, and are described in, for example, U.S. Pat. Nos. 4,782,143 and 4,603,110. In general, malto-oligosaccharides are characterized as having a saccharide backbone that predominantly comprises 1–4 glycoside linkages. Typically, malto-oligosaccharides are prepared by controlled hydrolytic cleavage or cleavages of a starch or starches. The glycosidic linkages of the starch molecules are partially hydrolyzed to yield at least one oligosaccharide species, and more typically a mixture of oligosaccharide species. The mixture of malto-oligosaccharides thus prepared preferably is used as the starting material for glycosylation in accordance with the invention, although it is contemplated that the mixture further may include other saccharides species or other components.

Malto-oligosaccharides may be characterized by their degree of polymerization (DP), which refers to the number of glucopyranoside units in each molecule. Each malto-oligosaccharide saccharide species also may be characterized by its dextrose equivalent value (DE), which indicates the proportion of terminal units with aldehyde, hemiacetal, or ketone and groups in the molecule expressed as a percentage of the total units in the molecule. Malto-oligosaccharide mixtures having a DE less than 20 are known as maltodextrins, whereas malto-oligosaccharides having a DE of 20 or greater are known as syrup solids. In such mixtures, the species in the mixture generally differ at least in DP value, thus defining a DP profile for the mixtures. The DP profile may be partially defined by a saccharides species having a DP value of 1, for example, dextrose or sorbitol. DP and DE values for a malto-oligosaccharide mixtures can vary substantially, depending, for example, on the type of starch precursor used to obtained the malto-oligosaccharide mixture and the conditions employed for hydrolysis of the starch.

In embodiments of the invention where a single malto-oligosaccharide is glycosylated to produce a single malto-oligosaccharide derived glycoside, the malto-oligosaccharide starting material can have any suitable degree of polymerization prior to glycosylation for producing the desired malto-oligosaccharide derived glycoside. Preferably, the malto-oligosaccharide has a degree of polymerization of about 5 to about 50 prior to glycosylation, more preferably the malto-oligosaccharide has a degree of polymerization of about 5 to about 25 prior to glycosylation.

Suitable malto-oligosaccharide mixtures are sold as maltodextrins under the trademark MALTRIN® by Grain Processing Corporation of Muscatine, Iowa. The MALTRIN® maltodextrins are malto-oligosaccharide mixtures, each having a known typical DP profile. Suitable MALTRIN® maltodextrins that may be derivatized in accordance with the present invention include, for example, MALTRIN® M040, MALTRIN® M050, MALTRIN® M100, MALTRIN® M150, and MALTRIN® M180. Typical approximate DP profiles for the subject MALTRIN maltodextrins are set forth in the following table (the DP profiles being approximate as indicated in the table):

conditions suitable to result in a glycoside. The alcohol can be any suitable alcohol. Suitable alcohols include, for example, methanol, ethanol, isopropanol, n-propanol, n-butanol, sec-butanol, pentanol, hexanol, heptanol, octanol and other alkyl alcohols. Suitable alcohols further include aromatic alcohols (e.g., benzyl alcohol), double bond-containing alcohols (e.g., allyl alcohol), or ether linkage-containing alcohols (e.g., octylphenoxpolyethoxyethanol). The alcohol can be any of suitable length for producing the desired glycoside. Preferably, the malto-oligosaccharide is glycosylated with a $C_1$–$C_{30}$ alcohol (higher alcohols are not preferred). More preferably, the malto-oligosaccharide is glycosylated with methanol or ethanol. In embodiments of the invention where the glycosylation is performed with a thiol, any suitable thiol which can carry out the glycosylation of the malto-oligosaccharide can be employed. Preferably, the thiol will be a thiol nucleophile. Examples of such thiol nucleophiles include ethane thiol and butane thiol. The alcohol or thiol can be present in any suitable concentration for producing the desired malto-oligosaccharide derived glycoside. Preferably, the alcohol or thiol is present in a concentration of about 70% by weight of the total reaction mixture.

In most embodiments, the malto-oligosaccharide should be glycosylated under substantially anhydrous conditions. Often, malto-oligosaccharides are provided in aqueous

| DP profile | Typical DP profile (% dry solids basis) | | | | | | | | |
|---|---|---|---|---|---|---|---|---|---|
| | M180 | | M150 | | M100 | | M050 | | M040 |
| DP > 8 | 46.6 | ±4% | 54.7 | ±4% | 67.8 | ±4% | 90.6 | ±4% | 88.5 ±4% |
| DP 8 | 3.9 | ±2% | 4.8 | ±1.5% | 4.5 | ±1.5% | 1.5 | ±1% | 2.0 ±1% |
| DP 7 | 9.5 | ±2% | 9.1 | ±1.5% | 7.0 | ±1.5% | 1.5 | ±1% | 2.4 ±1% |
| DP 6 | 11.4 | ±2% | 8.4 | ±1.5% | 6.1 | ±1.5% | 1.4 | ±1% | 1.8 ±1% |
| DP 5 | 5.9 | ±2% | 4.7 | ±1.5% | 3.3 | ±1.5% | 1.3 | ±1% | 1.3 ±1% |
| DP 4 | 6.4 | ±2% | 5.5 | ±1.5% | 3.7 | ±1.5% | 1.1 | ±1% | 1.4 ±1% |
| DP 3 | 8.3 | ±2% | 6.7 | ±1.5% | 4.2 | ±1.5% | 1.0 | ±1% | 1.4 ±1% |
| DP 2 | 6.2 | ±2% | 4.8 | ±1% | 2.5 | ±1% | 0.8* | ±1% | 0.9* ±1% |
| DP 1 | 1.8 | ±1.5% | 1.3 | ±1% | 0.7* | ±1% | 0.8* | ±1% | 0.3* ±1% |

*MINIMUM VALUE = 0%

The invention encompasses the production of malto-oligosaccharide derived glycosides using maltodextrin starting materials that have substantially the foregoing approximate DP profiles, however made. Other malto-oligosaccharides suitable for use in conjunction with the invention include other maltodextrins, such as MALTRIN® M440, MALTRIN® M510, MALTRIN® M550, MALTRIN® M580, MALTRIN® M700, as well as corn syrup solids such as MALTRIN® M200 and MALTRIN® M250 (these having a DE>25). The invention is not limited to glycosylation of the foregoing malto-oligosaccharides species or mixtures, and indeed, any suitable malto-oligosaccharide may glycosylated to produce malto-oligosaccharide derived glycosides. For example, as discussed in copending application Ser. No. 09/378,673, entitled Derivatized Reduced Malto-oligosaccharides, filed on Aug. 20, 1999, malto-oligosaccharides may be derivatized with a variety of derivatizing agents. Malto-oligosaccharides that have been derivatized (such as via techniques disclosed in the foregoing application with respect to hydrogenated malto-oligosaccharides) are useful in conjunction with the invention.

In accordance with the invention, the malto-oligosaccharide is glycosylated with an alcohol or a thiol, preferably an alcohol, but in either case under glycosylation solutions, in which case water can be removed from the malto-oligosaccharide-containing solution by any suitable technique, such as evaporation or solvent precipitation. Once the malto-oligosaccharide has been obtained, final dewatering may be accomplished by washing, typically, by using the reacting alcohol (such as anhydrous methanol) to remove at least a substantial proportion of the water content. Desirably, the water content of the reaction mixture is less than about 10% by weight of the content of the total reaction before and/or during glycosylation of the malto-oligosaccharide; more preferably, the water content is less than about 5%, even more preferably, the water content is less than about 2%, and optimally the water content is about 1% or less of the total reaction mixture prior to and during glycosylation of the malto-oligosaccharide. It is especially preferred that such low water content levels are achieved immediately prior to and during glycosylation of the malto-oligosaccharide. Multiple washes of the malto-oligosaccharide in a slurry of the alcohol can be made if necessary to achieve the desired anhydrous conditions.

Preferably, the malto-oligosaccharide is glycosylated in the presence of a catalyst which facilitates the production of glycosides and which decreases the reaction time. Any suitable catalyst can be employed, but the catalyst preferably is an acid catalyst. The acid catalyst can be any suitable acid catalyst, of which several are known in the art. Examples include ortho sulfonic acid, meta sulfonic acid, benzensulfonic acid, ethanesulfonic acid, hydrochloric acid, phosphoric acid, sulfuric acid, citric acid, p-toluenesulfonic acid, and combinations thereof. A particularly preferred acid catalyst is p-toluenesulfonic acid. When an acid catalyst is used, it can be present in any concentration effective to catalyze the glycosylation. For example, when p-toluenesulfonic acid is used, it may be present in a concentration of about 0.75% by weight of the starting substrate malto-oligosaccharide. The reaction alternatively may be catalyzed in the presence of a strong cationic resin. In some instances it may be desirable to add other reactants prior to and/or during glycosylation to facilitate in the production of the malto-oligosaccharide derived glycosides. For example, the malto-oligosaccharide may be glycosylated in the presence of dimethyl sulfoxide, dimethyl formamide, or combination thereof. Such reactants are preferably added when the invention is practiced with alcohols with higher molecular weights to maintain solubility and aid in processing.

The alcohol or thiol and the malto-oligosaccharide may react under any suitable temperature and pressure to produce the glycoside. As a general guideline, the reaction temperature will typically be at least about 100° C. Preferably, the reaction temperature will be at least about 130° C., more preferably at about 155–170° C. and optimally at about 160–165° C. The reaction pressure will vary based on temperature and other considerations. Typically, when methanol is used at a reaction temperature of about 160° C., pressure will be about 300 psi, but the pressure can be more or less. Generally, the glycosylation can be carried out in any suitable container or vessel. Preferably, in large scale production, a stirred batch reactor, such as a Parr stirred reactor which is commercially available from Parr Instrument Co. (Moline, Ill.), is used.

The glycosylation is carried out for any suitable period of time, depending on the reaction conditions (e.g., pressure, temperature and/or presence and type of catalyst used). As a general guideline, for a reaction carried out with a low molecular weight alcohol (such as methanol or ethanol), at a temperature of about 160° C. in the presence of p-toluenesulfonic acid, about one hour is sufficient.

By varying the reaction conditions, one of ordinary skill in the art may cause the DP weighting of the resulting glycoside mixture to vary according to a desired DP weighting. In accordance with a preferred embodiment of the invention, reaction conditions for a desired DP weighting may be selected for a starting mixture of malto-oligosaccharides to thereby result in a product with the desired DP weighting. Generally, although it is difficult to specify a desired DP profile with precision, the DP weighting of the resulting mixture of glycosides can be specified with some particularity relative to other DP profiles obtainable using other reaction conditions or starting materials (for instance, whether the glycosides are predominantly of DP 1–2, or whether there will be a substantial percentage of glycosides with DP≧10, and so forth). One may select a starting malto-oligosaccharide mixture and reaction conditions for that mixture in order to obtain the desired DP weighting. The effects of temperature, reaction time, acid activity level, and solids level on the DP weighting of commercial malto-oligosaccharide mixtures is illustrated in some of the following Examples.

The following Examples further illustrate the present invention, but should not be construed as in any way limiting its scope.

EXAMPLE 1

This Example demonstrates the production of a mixture of malto-oligosaccharide derived glycosides in accordance with the present invention by glycosylation of a mixture of malto-oligosaccharides. More specifically, different DP profiles can be obtained by the use of different malto-oligosaccharide starting materials in the context of the invention, and mixtures of malto-oligosaccharides may be glycosylated to produce glycosides much more readily than can unmodified starch.

Three mixtures of malto-oligosaccharides were selected for producing glycosides, as follows:

(1) MALTRIN® M040, 450 g mixture consisting of about 8.6 wt. % $H_2O$ and about 411 g of dry solid malto-oligosaccharide, (2) MALTRIN® M100, 450 g mixture consisting of about 7.3 wt. % $H_2O$ and about 417.2 g dry solid malto-oligosaccharide, and (3) MALTRIN® M180, 450 g mixture consisting of about 7.3 wt. % $H_2O$ and about 417.2 g dry solid malto-oligosaccharide.

The malto-oligosaccharides were dehydrated by making a slurry of each malto-oligosaccharide in 1050 mL of anhydrous methanol. After stirring the reaction mixture for fifteen minutes, the slurry was vacuum filtered and the filter cake was re-suspended in a second 1050 mL volume of anhydrous methanol. P-toluenesulfonic acid (0.75% based on the dry solid weight of the reaction mixture) was added to the slurry and allowed to mix for 15 minutes. Titratable acid (TA) was determined by removing about 75 g of the slurry and filtering it on Whatman #1 filter paper. The filtrate was titrated to pH 3.5 using 0.1 N NaOH. The filtrate TA was found to be 29.4 mL of 0.1 N NaOH per 100 g. The slurry was placed in a 2 liter Parr reactor, sealed, and heated to 162° C. and held at this temperature for 60 minutes at a stir rate of 450 rpm. The reaction solids were 29.7% of the total mixture content. The maximum pressure in the reaction was 280 psi.

The reaction was cooled using water from an internal coil. The reactor was unsealed and the reaction solution removed. Following cooling and removal from the reactor, the pH of each solution was adjusted from 2.9 to 6.9 with 2.8 g of 3% NaOH. The solution was then evaporated in a Buchi Rotovap to a point where the solids composed 67% of the total reaction mixture. Residual methanol was removed by co-evaporation with water. No crystal formation was observed. The reaction content was then adjusted so that the solids composed 60% of the reaction mixture. The sample was then analyzed for dextrose and DE. The carbohydrate profile was analyzed by high performance liquid chromatography and matrix assisted laser desorption ionization (MALDI) mass spectrophotometry.

Comparative Example 1

To compare the production of saccharide derived glycosides from malto-oligosaccharide starting materials with starch, 450 g of an unmodified starch (starch B200, available from Grain Processing Corporation of Muscatine, Iowa) was subjected to glycosylation under similar conditions to those described with regard to the aforementioned malto-oligosaccharides. Specifically, 450 g of B200 (consisting of a mixture of 10.2 wt. % $H_2O$ and 404.1 grams of dry solid B200), was dehydrated with a slurry of the starch in 1050 mL of anhydrous methanol. The starch was stirred for 15 minutes and then vacuum filtered and subsequently resuspended in 1050 mL anhydrous methanol. P-toluenesulfonic acid, at a concentration of 0.78% of the weight of the starch, was added to the slurry and allowed to mix for 15 minutes. Titratable acidity was determined by removing about 75 g of the slurry and filtering the sample on Whatman #1 filter paper. The TA was calculated to be 22.4 mL of 0.1 NaOH per 100 g of the filtrate. The solids were calculated to make up 30.7% of the reaction mixture.

The reaction mixture was placed in the same 2 L Parr stirred reactor described above. Reaction pressure in the reactor was 270 psi. The reaction was cooled using water through an internal coil. Following cooling and removal from the reactor. The pH of the solution was raised from 1.6 to 6.9 with 9.5 g of 3% NaOH. The solution was then evaporated in a Buchi Rotovap to a point where solids made up 60% of the total reaction mixture. Residual MeOH was removed by co-evaporation with water. Formation of dark crystals was noted during the evaporation, which were dissolved in the subsequent water addition. The reaction mixture was analyzed for dextrose and DE. The carbohydrate profile was analyzed by HPLC and MALDI analysis.

The results of the DE and HPLC analysis for the three selected malto-oligosaccharides and for the B200 starch is set out in Table 1.

TABLE 1

HPLC Profile for Selected Saccharide Derived Glycosides

| | Saccharide starting substrate | | | |
|---|---|---|---|---|
| Reaction product | B200 | M040 | M100 | M180 |
| | Percent of total mixture at completion | | | |
| α - methyl glucoside (MeG) | 59.5 | 20.8 | 30.2 | 46.0 |
| β- methyl glucoside (MeG) | 30.3 | 19.1 | 25.3 | 30.7 |
| DP-2 | 0.0 | 5.5 | 6.8 | 6.3 |
| DP-3 | 0.0 | 11.0 | 11.9 | 8.7 |
| DP-4 | 0.6 | 8.1 | 7.8 | 4.4 |
| DP-5 | 0.0 | 5.8 | 5.0 | 1.7 |
| DP 6–9 | 0.0 | 9.5 | 7.2 | 1.1 |
| DP-10 or higher | 0.7 | 20.2 | 5.6 | 1.1 |
| Dextrose | 1.8% | 1% | 1.5% | 2.1% |
| DE | 2.2 | 2.3 | 2.8 | 2.7 |

As can be seen in Table 1, the malto-oligosaccharides produced remarkably different mixtures of saccharide derived glycosides than the B200 starch. Specifically, as seen in Table 1, the B200 starch produced primarily monomeric methyl glucosides (89.8% methyl glucosides, and 91.6% total DP 1 saccharides), whereas the malto-oligosaccharides produced significant less methyl glucosides (only 39.9% for M040, 55.5% for M100, and 76.7% for M180 with 40.9%, 57%, and 78.2% total DP 1 saccharides in the mixture). Moreover, as also seen in Table 1, the DP weighting of saccharide derived glycosides produced by the B200 starch was significantly weighted towards lower order DP species. Specifically, almost 99% of the saccharide derived glycosides produced by the glycosylation of the B200 starch had a DP of 2 or less. In comparison, the glycosylation of the selected malto-oligosaccharides, M040, M100, and M180, provided a mixture of glycosides weighted towards higher DP profiles.

For data obtained by MALDI analysis for both the starch and the selected malto-oligosaccharides, the actual weight of the oligosaccharide and sodium ion and the theoretical weight were compared. The results of these experiments are set forth in Table 2.

TABLE 2

MALDI Spectroscopy Analysis (major peaks listed as the Na$^+$ ion)

| | Molecular weights | | | | | |
|---|---|---|---|---|---|---|
| | Theoretical MW | | Actual MW — After glycosylation | | | |
| | Starting material | Methyl glycoside | B200 | M100 | M040 | M180 |
| DP-3 | 526 | 540 | 545 | 542 | 542 | 545 |
| DP-4 | 688 | 702 | 709 | 704 | 704 | 708 |
| DP-5 | 851 | 864 | 871 | 866 | 868 | 871 |
| DP-6 | 1012 | 1026 | — | 1028 | 1029 | 1031 |
| DP-7 | 1174 | 1188 | — | 1190 | 1191 | 1198 |
| DP-8 | 1136 | 1350 | — | 1352 | 1353 | — |
| DP-9 | 1498 | 1512 | — | 1514 | 1515 | — |
| DP-10 | 1660 | 1674 | — | 1677 | 1677 | — |
| DP-11 | 1822 | 1836 | — | 1838 | 1837 | — |
| DP-12 | 1984 | 1998 | — | 1997 | 1999 | — |
| DP-13 | 2146 | 2160 | — | 2159 | 2163 | — |
| DP-14 | 2308 | 2322 | — | 2318 | 2317 | — |
| DP-15 | 2470 | 2484 | — | 2483 | 2483 | — |
| DP-16 | 2632 | 2646 | — | 2651 | 2647 | — |
| DP-17 | 2794 | 2808 | — | 2806 | 2809 | — |
| DP-18 | 2956 | 2970 | — | 2965 | 2967 | — |
| DP-19 | 3118 | 3132 | — | 3138 | 3129 | — |
| DP-20 | 3280 | 3294 | — | — | 3296 | — |
| DP-21 | 3442 | 3456 | — | — | 3456 | — |
| DP-22 | 3604 | 3618 | — | — | 3611 | — |

*The molecular weights were calculated based on the weight of the molecule plus 23 (to account for the addition of sodium) minus 1 (to account for the loss of hydrogen).

The results of the experiments shown in Table 2 further demonstrate and verify that glycosylation of the B200 starch did not result in malto-oligosaccharides having DPs of 5 or greater in any significant amount, whereas the glycosylation of the selected malto-oligosaccharides produced a mixture of malto-oligosaccharide derived glycosides which included malto-oligosaccharide derived glycosides weighted towards higher DP glycosides.

These results demonstrate that malto-oligosaccharide mixtures used in the context of the present invention produce unique malto-oligosaccharide derived glycoside mixtures compared to starch. Through the selection of a particular mixture of malto-oligosaccharides as a starting substrate, a mixture of glycosides having a desired DP weighting may be obtained.

EXAMPLE 2

This Example demonstrates the effect of modifying the reaction time of the glycosylation of a mixture of malto-oligosaccharides on the resulting properties of the mixture of malto-oligosaccharide derived glycosides produced.

Two samples of MALTRIN® M100 (450 g) were treated in the same manner as described in Example 1, except that reaction time was held at either 30 minutes, 62 minutes, or 90 minutes. Results of HPLC analysis are set forth below:

TABLE 3

Effect of Glycosylation Reaction Time on Malto-Oligosaccharide Derived Glycoside Product Profiles

| | Glycosylation Reaction Time | | |
|---|---|---|---|
| | 30 minutes | 62 minutes | 90 minutes |
| Reaction product | Percent of total mixture at reaction completion | | |
| α-MeG | 19.7 | 30.2 | 42.1 |
| β-MeG | 18.0 | 25.3 | 27.5 |
| DP-2 | 6.0 | 6.8 | 7.1 |
| DP-3 | 11.9 | 11.9 | 10.1 |
| DP-4 | 9.2 | 7.8 | 5.9 |
| DP-5 | 5.9 | 5.0 | 3.2 |
| DP 6–9 | 11.1 | 7.2 | 2.0 |
| DP of 10 or higher | 18.1 | 5.6 | 2.0 |
| Dextrose | 1.2% | 1.5% | 2.1% |
| DE | 2.9 | 2.8 | 3.6 |

As can be seen in Table 3, by varying the reaction time, the characteristics of the resulting mixture of malto-oligosaccharide derived glycosides, particularly the DP profile of such glycosides, may vary. For M100 malto-oligosaccharides glycosylated for 30 minutes, the percentage of glucosides in the reaction mixture at completion was only 37.7% compared to 55.5% when the glycosylation reaction was allowed to run for 62 minutes (approximately a 32% decrease in total MeG obtained). In contrast, for a reaction time of 90 minutes, the percentage of glucosides increased to 69.6% (approximately a 25% increase in total MeG obtained).

In general, DP weighting tended towards lower-order DP glycosides for longer reaction times, and towards higher DP glycosides for shorter reaction times. One may use this criterion in selecting reaction conditions for a desired DP weighting.

EXAMPLE 3

This Example demonstrates the effect of varying the level of acid catalyst in the glycosylation reaction on the resulting malto-oligosaccharide product profile.

MALTRIN® M100 (450 g) was reacted in the same manner as described in Example 1, except that either 0.50% or 1.00% p-toluenesulfonic acid was employed. The product characteristics are set forth below:

TABLE 4

Effect of Acid Concentration on Malto-oligosaccharide Derived Glycoside Product Profile

| | Concentration of Acid Catalyst | | |
|---|---|---|---|
| | 0.50% p-TSA | 0.75% p-TSA | 1.00% p-TSA |
| Reaction product | Percent of total mixture at reaction completion | | |
| α-MeG | 16.5 | 30.2 | 55.8 |
| β-MeG | 17.0 | 25.3 | 29.0 |
| DP-2 | 5.7 | 6.8 | 5.8 |
| DP-3 | 12.3 | 11.9 | 6.4 |
| DP-4 | 9.8 | 7.8 | 1.4 |
| DP-5 | 6.7 | 5.0 | 0 |
| DP 6–9 | 12.8 | 7.2 | 0 |
| DP of 10 or higher | 19.2 | 5.6 | 1.5 |
| Dextrose | 0.8% | 1.5% | 1.2% |
| DE | 2.3 | 2.8 | 1.5 |

These experiments demonstrate that the concentration of acid catalyst affects DP weighting of the glycoside mixture.

EXAMPLE 4

This Example demonstrates the effect of temperature on the production of malto-oligosaccharide derived glycosides by the present invention.

MALTRIN® M100 (450 g) was reacted in the same manner as in Example 1, except that the reaction temperature was maintained at 172° C. for one hour instead of 162° C. A similar experiment was performed with a reaction temperature of 152° C., but no recoverable product was obtained. The product characteristics are set forth below:

TABLE 5

Effect of Glycosylation Reaction Temperature on Malto-oligosaccharide Derived Glycoside Product Profile

| | Reaction Temperature | |
|---|---|---|
| Reaction product | 162° C. | 172° C. |
| α-MeG | 30.2 | 40.2 |
| β-MeG | 25.3 | 27.2 |
| DP-2 | 6.8 | 6.2 |
| DP-3 | 11.9 | 11.0 |
| DP-4 | 7.8 | 6.5 |
| DP-5 | 5.0 | 3.9 |
| DP 6–9 | 7.2 | 4.1 |
| DP of 10 or higher | 5.6 | 0.9 |
| Dextrose | 1.5% | 0.6% |
| DE | 2.8 | 1.7 |

These results demonstrate that the reaction temperature can affect the resulting glycoside product.

EXAMPLES 5

This Example demonstrates the effect of modifying the percentage of solid malto-oligosaccharides in the reaction mixture prior to glycosylation on the resulting malto-oligosaccharide product profile.

Two samples of MALTRIN® M100 (450 g) were reacted in the same manner as described in Example 1, except that the concentration of solid malto-oligosaccharides in the reaction mixture prior to glycosylation was set at either 36.8% or 19.3% instead of the 29.7% used in Example 1. The product characteristics are set forth below:

TABLE 6

Effect of Concentration of Substrate Solids on Malto-oligosaccharide Derived Glycoside Product Profile

| | Concentration of Solid Substrates in Reaction Mixture Prior to Glycosylation | | |
|---|---|---|---|
| | 19.3% | 29.7% | 36.8% |
| Reaction product | Percent of total mixture at reaction completion | | |
| α-MeG | 21.8 | 30.2 | 34.4 |
| β-MeG | 22.5 | 25.3 | 26.3 |
| DP-2 | 5.8 | 6.8 | 7.1 |
| DP-3 | 12.4 | 11.9 | 11.9 |
| DP-4 | 8.6 | 7.8 | 7.5 |
| DP-5 | 5.4 | 5.0 | 5.3 |
| DP 6–9 | 9.8 | 7.2 | 3.6 |
| DP of 10 or higher | 13.7 | 5.6 | 4.0 |
| Dextrose | 0.3% | 2.8% | 0.8% |
| DE | 4.1 | 2.8 | 8.1 |

These experiments demonstrate that the percentage of solid substrate material also affects the DP weighting of the glycoside product.

Thus, it is seen that the invention provides a method for producing glycosides having a higher DP than is conventionally obtainable via glycosylation of dextrose or starch.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the claims. All references and copending applications cited herein are hereby incorporated by reference in their entireties.

What is claimed is:

1. A method for preparing a malto-oligosaccharide derived glycoside, comprising:
   a) providing a malto-oligosaccharide, and
   b) glycosylating the malto-oligosaccharide with an alcohol or a thiol under glycosylation conditions suitable to form a malto-oligosaccharide derived glycoside, wherein the content of water prior to and during glycosylation is about 1% or less, said malto-oligosaccharide having a degree of polymerzation of three or greater.

2. The method of claim 1, wherein the alcohol or thiol is a $C_1$–$C_{30}$ alcohol or thiol.

3. The method of claim 2, wherein the malto-oligosaccharide is glycosylated with a $C_1$–$C_{30}$ alcohol.

4. The method of claim 3, wherein the malto-oligosaccharide is glycosylated with methanol or ethanol.

5. The method of claim 1, wherein the malto-oligosaccharide has a degree of polymerization of about 5 to about 50 prior to glycosylation.

6. The method of claim 5, wherein the malto-oligosaccharide has a degree of polymerization of about 5 to about 25 prior to glycosylation.

7. The method of claim 1, wherein the malto-oligosaccharide is glycosylated with the alcohol or thiol in the presence of an acid catalyst.

8. The method of claim 7, wherein the acid catalyst is selected from the group consisting of ortho sulfonic acid, meta sulfonic acid, benzensulfonic acid, ethanesulfonic acid, hydrochloric acid, phosphoric acid, sulfuric acid, citric acid, p-toluenesulfonic acid, and combinations thereof.

9. The method of claim 8, wherein the acid catalyst is p-toluenesulfonic acid.

10. The method of claim 1, wherein the alcohol is an aromatic alcohol, a double bond-containing alcohol, or an ether linkage-containing alcohol.

11. The method of claim 1, wherein the malto-oligosaccharide is glycosylated at a temperature ranging from about 150–170° C.

12. The method of claim 1, wherein the malto-oligosaccharide is glycosylated in the presence of dimethyl sulfoxide, dimethyl formamide, or combination thereof.

13. A method for preparing a mixture of malto-oligosaccharide derived glycosides, comprising:
    a) providing a mixture of malto-oligosaccharides, and
    b) glycosylating the malto-oligosaccharides with an alcohol or a thiol under glycosylation conditions suitable to form a mixture of malto-oligosaccharide derived glycosides, wherein the content of water prior to and during glycosylation is about 1% or less, wherein at least one malto-oligosaccharide in said mixture has a degree of polymerzation of three or greater.

14. The method of claim 13, wherein the mixture of malto-oligosaccharides comprises one or more malto-oligosaccharide having a degree of polymerization of about 5 to about 50 prior to glycosylation.

15. The method of claim 14, wherein one or more of the malto-oligosaccharides in said mixture has a degree of polymerization of about 5 to about 25.

16. The method of claim 13, wherein the alcohol or thiol is a $C_1$–$C_{30}$ alcohol or thiol.

17. The method of claim 13, wherein the mixture of malto-oligosaccharides is glycosylated with a $C_1$–$C_{30}$ alcohol.

18. The method of claim 17, wherein the mixture of malto-oligosaccharides is glycosylated with methanol or ethanol.

19. The method of claim 13, wherein the mixture of malto-oligosaccharides is glycosylated with the alcohol or thiol in the presence of an acid catalyst.

20. The method of claim 19, wherein the acid catalyst is an ortho sulfonic acid, meta sulfonic acid, benzensulfonic acid, ethanesulfonic acid, hydrochloric acid, phosphoric acid, sulfuric acid, citric acid, p-toluenesulfonic acid, and combinations thereof.

21. The method of claim 20, wherein the acid catalyst is p-toluenesulfonic acid.

22. The method of claim 13, wherein the alcohol is an aromatic alcohol, a double bond-containing alcohol, or an ether linkage-containing alcohol.

23. The method of claim 13, wherein said glycosylation is performed at a temperature ranging from about 150 to about 170° C.

24. The method of claim 13, wherein the malto-oligosaccharide is glycosylated in the presence of dimethyl sulfoxide, dimethyl formamide, or combination thereof.

25. The method of claim 13, wherein the dry weight percentage of the mixture of malto-oligosaccharides is about 25% or greater of the total saccharides present when glycosylation takes place.

26. A method for preparing a mixture of malto-oligosaccharide derived glycosides, comprising the steps of:
    providing a mixture of malto-oligosaccharides;
    providing an alcohol or thiol;
    selecting glycosylation reaction conditions suitable for glycosylation of said malto-oligosaccharide with said alcohol or thiol based on a desired DP weighting of the resulting glycoside, said reaction conditions including a water content prior to and during glycosylation of about 1% or less, wherein at least one malto-oligosaccharide in said mixture has a degree of polymerization of three or greater.

27. The method of claim 26, wherein the alcohol or thiol is a $C_1$–$C_{30}$ alcohol or thiol.

28. The method of claim 27, wherein the malto-oligosaccharide is glycosylated with a $C_1$–$C_{30}$ alcohol.

29. The method of claim 28, wherein the malto-oligosaccharide is glycosylated with methanol or ethanol.

30. The method of claim 26, wherein the malto-oligosaccharide has a degree of polymerization of about 5 to about 50 prior to glycosylation.

31. The method of claim 30, wherein the malto-oligosaccharide has a degree of polymerization of about 5 to about 25 prior to glycosylation.

32. The method of claim 26, wherein the malto-oligosaccharide is glycosylated with the alcohol or thiol in the presence of an acid catalyst.

33. The method of claim 32, wherein the acid catalyst is selected from the group consisting of ortho sulfonic acid, meta sulfonic acid, benzensulfonic acid, ethanesulfonic acid, hydrochloric acid, phosphoric acid, sulfuric acid, citric acid, p-toluenesulfonic acid, and combinations thereof.

34. The method of claim 33, wherein the acid catalyst is p-toluenesulfonic acid.

35. The method of claim 26, wherein the alcohol is an aromatic alcohol, a double bond-containing alcohol, or an ether linkage-containing alcohol.

36. The method of claim 26, wherein the malto-oligosaccharide is glycosylated at a temperature ranging from about 150–170° C.

37. The method of claim 26, wherein the malto-oligosaccharide is glycosylated in the presence of dimethyl sulfoxide, dimethyl formamide, or combination thereof.

38. The method of claim 28, wherein said malto-oligosaccharide is selected based on said desired DP weighting.

39. A method for preparing a mixture of malto-oligosaccharide derived glycosides, comprising:
 a) providing a mixture of malto-oligosaccharides, and
 b) glycosylating the malto-oligosaccharides with an alcohol or a thiol under glycosylation conditions suitable to form a mixture of malto-oligosaccharide derived glycosides, wherein at least about 46.6% of the malto-oligosaccharide in said mixture have a degree of polymerization greater than 8.

40. A method for preparing a mixture of malto-oligosaccharide derived glycosides, comprising:
 a) providing a mixture of malto-oligosaccharides, and
 b) glycosylating the malto-oligosaccharides with an alcohol or a thiol under glycosylation conditions suitable to form a mixture of malto-oligosaccharide derived glycosides, wherein at least about 80% of the malto-oligosaccharide in said mixture have a degree of polymerization greater than 5.

41. A method for preparing a mixture of malto-oligosaccharide derived glycosides, comprising:
 a) providing a mixture of malto-oligosaccharides, and
 b) glycosylating the malto-oligosaccharides with an alcohol or a thiol under glycosylation conditions suitable to form a mixture of malto-oligosaccharide derived glycosides, wherein at least one of the malto-oligosaccharide in said mixture has a degree of polymerization of 8 or more.

42. A method for preparing a mixture of malto-oligosaccharide derived glycosides, comprising:
 a) providing a mixture of malto-oligosaccharides, and
 b) glycosylating the malto-oligosaccharides with an alcohol or a thiol under glycosylation conditions suitable to form a mixture of malto-oligosaccharide derived glycosides, wherein said mixture of malto-oligosaccharides is a maltodextrin.

43. The method of claim 42, wherein the alcohol or thiol is a $C_1$–$C_{30}$ alcohol or thiol.

44. The method of claim 42, wherein the mixture of malto-oligosaccharides is glycosylated with a $C_1$–$C_{30}$ alcohol.

45. The method of claim 44, wherein the mixture of malto-oligosaccharides is glycosylated with methanol or ethanol.

46. The method of claim 42, wherein the content of water prior to and during glycosylation is about 1% or less.

47. The method of claim 42, wherein the mixture of malto-oligosaccharides is glycosylated with the alcohol or thiol in the presence of an acid catalyst.

48. The method of claim 47, wherein the acid catalyst is an ortho sulfonic acid, meta sulfonic acid, benzensulfonic acid, ethanesulfonic acid, hydrochloric acid, phosphoric acid, sulfuric acid, citric acid, p-toluenesulfonic acid, and combinations thereof.

49. The method of claim 48, wherein the acid catalyst is p-toluenesulfonic acid.

50. The method of claim 42, wherein the alcohol is an aromatic alcohol, a double bond-containing alcohol, or an ether linkage-containing alcohol.

51. The method of claim 42, wherein said glycosylation is performed at a temperature ranging from about 150 to about 170° C.

52. The method of claim 42, wherein the malto-oligosaccharide is glycosylated in the presence of dimethyl sulfoxide, dimethyl formamide, or combination thereof.

53. The method of claim 42, wherein the dry weight percentage of the mixture of malto-oligosaccharides is about 25% or greater of the total saccharides present when glycosylation takes place.

* * * * *

UNITED STATES PATENT AND TRADEMARK OFFICE
CERTIFICATE OF CORRECTION

PATENT NO.    : 6,528,629 B2
DATED         : March 4, 2003
INVENTOR(S)   : Rogers et al.

It is certified that error appears in the above-identified patent and that said Letters Patent is hereby corrected as shown below:

Column 1,
Line 22, "Hill et all." should read -- Hill et al. --

Column 13,
Line 4, "28" should read -- 26 --

Signed and Sealed this

Fifth Day of August, 2003

JAMES E. ROGAN
*Director of the United States Patent and Trademark Office*